No. 634,597. Patented Oct. 10, 1899.
J. H. WARREN.
RUNNING GEAR FOR VEHICLES.
(Application filed May 26, 1899.)
(No Model.)
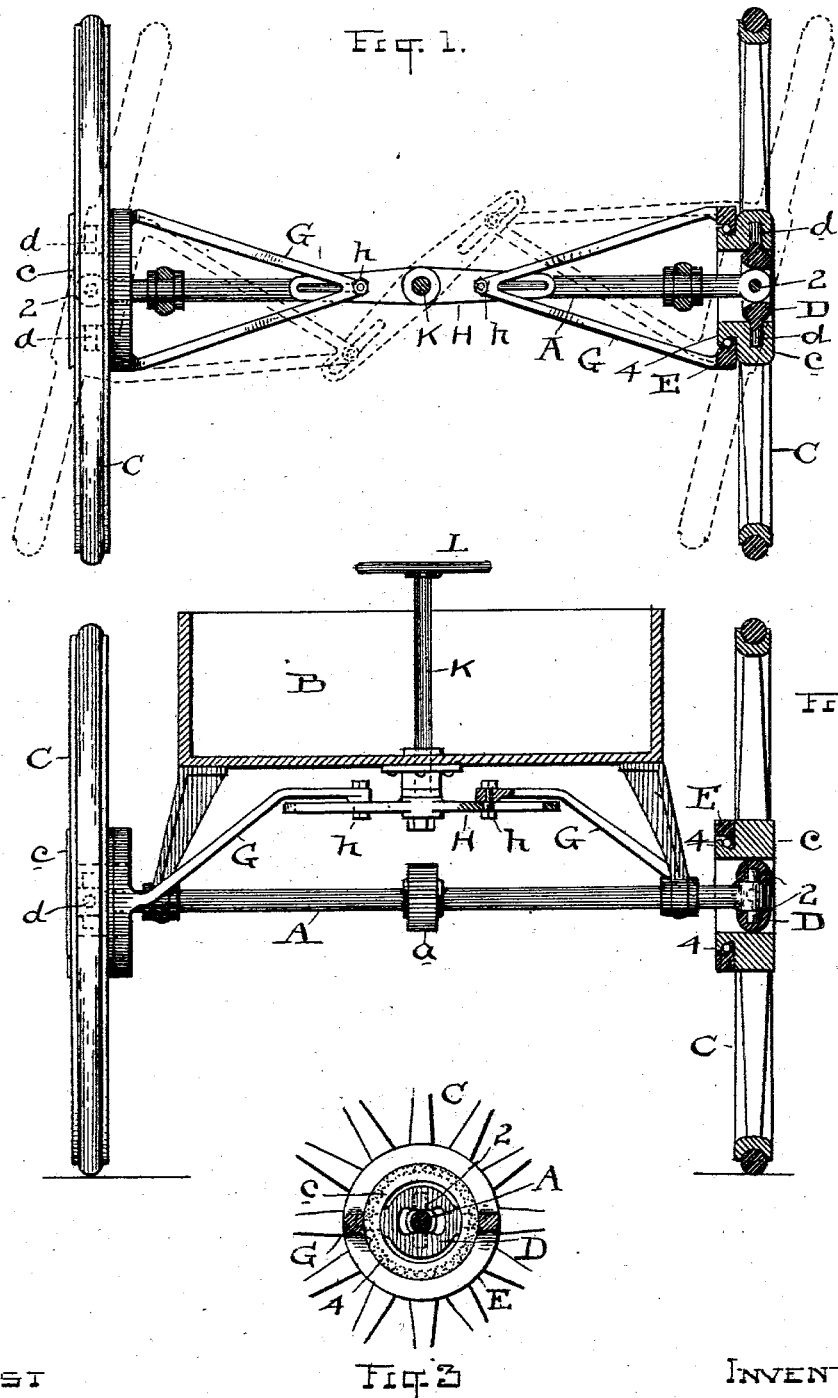
ATTEST
INVENTOR.
JOHN H WARREN
BY H. F. Fisher ATTY

UNITED STATES PATENT OFFICE.

JOHN H. WARREN, OF CLEVELAND, OHIO.

RUNNING-GEAR FOR VEHICLES.

SPECIFICATION forming part of Letters Patent No. 634,597, dated October 10, 1899.

Application filed May 26, 1899. Serial No. 718,324. (No model.)

*To all whom it may concern:*

Be it known that I, JOHN H. WARREN, a citizen of the United States, residing at Cleveland, in the county of Cuyahoga and State of Ohio, have invented certain new and useful Improvements in Running-Gear for Vehicles; and I do declare that the following is a full, clear, and exact description of the invention, which will enable others skilled in the art to which it appertains to make and use the same.

My invention relates to improvements in running-gear for power-propelled vehicles; and the invention consists in the construction of running-gear and means for operating the same whereby the power may be applied to the front axle and the front wheels employed to guide and turn the vehicle, all substantially as shown and described, and particularly pointed out in the claims.

In the accompanying drawings, Figure 1 is a plan view of the front wheels and axle of a running-gear and of associated parts in which my invention is shown, the right wheel being partly in cross-section at the hub. Fig. 2 is an elevation of Fig. 1, with the right wheel in vertical section and the body or box of the vehicle supported on the axle and in cross-section. Fig. 3 is a side elevation of the hub with axle in section.

Heretofore in power-driven road-vehicles—such as motor-carriages and horseless turnouts generally, in which the steering necessarily involves the turning of the front wheels—it has been the invariable practice, so far as I know, to apply the power to the rear axle instead of the front, because the front axle had to be left free to move horizontally about the fifth-wheel or center bolt for the guiding and steering of the vehicle, after the manner of an ordinary carriage or wagon. Hence the power attachments or connections could not be made with this axle, as they necessarily must be with an axle that has no horizontal rotation, but which of course is free to revolve about its own axis. This accounts for the practice of connecting up with the rear axle and the application of the power where it is by no means as effective or desirable as at the front.

My invention therefore has in view the bringing up of the power to bear at the front of the vehicle, where it belongs, and to this end I have made a construction in which the front axle A is given a rotation about its own axis by the application of power directly to the pinion $a$ or through any other suitable power connection, but is otherwise stationary and has not the usual horizontal movement as in front axles generally to turn the vehicle. To these ends any stationary connection may be made with the rear axle or the wagon body or box B, or both. Hence the two axles, front and rear, are always to be parallel and fixed in my new style of vehicle. Then in order to get the desired movement for the turning of the vehicle, as well as freedom in steering, I construct the wheels C with a hub $c$, in which I make a universal-joint connection with the axle A by a disk D, having opposite pivot points or projections $d$ socketed in the hub $c$ and free to turn therein, as seen in Fig. 1. The bore or central opening of the hub is large enough to accommodate a good-sized disk, so that it will be strong enough for all purposes, and the axle A is supported centrally in said disk by means of a cross-pin or projection 2, socketed in the disk at right angles to the pins $d$. Both disk D in the hub and the axle A in said disk are thus given such freedom of action that the wheel C can be turned to occupy any needed angle to the direction of travel to turn the vehicle either way while in rotation. In these turnings the disk D has more or less in-and-out play on its own pivots; but the wheel C is held vertical or upright through all positions of the disk and relations of the wheel to the axle by means of the ring E, which runs over friction-balls, in this case, on the inner flanged portion 4 of the wheel-hub, and the double-armed or V-shaped frame G rigid with said ring and engaged therewith on a plane with the axle A, at each side thereof. In elevation the shape of the part G is as shown in Fig. 2, and the upper portion is engaged by a bolt or screw through its end with the slotted horizontally-rotatable lever H, which is governed by the steering-rod K and hand-wheel L. The ends of the lever H are slotted longitudinally to accommodate the bolts $h$, which connect the arms G, and thus through the medium of the hand-wheel L and the intermediate mechanism the two front wheels C are brought into complete control of the operator, and he can easily rotate them on their vertical axis to any inclination or deflection he may wish in turning the wagon around or going in any direction.

What I claim as new, and desire to secure by Letters Patent, is—

1. In power-propelled vehicles, the front axle and means to connect power therewith, the wheels having hubs and disks in the hubs pivotally connected therewith and with the extremities of the axle, and means connected with the hubs of the wheels to hold them in a vertical plane and to change the direction of travel consisting of a ring on each hub, a lever rigid with each ring and a horizontally-rotatable member engaging said levers and serving as a steadying and guiding medium, substantially as described.

2. The axle and the wheels supported thereon by means of substantially universal joints, and means for turning the wheels on said joints to govern the direction of travel and hold them in a vertical plane comprising a ring rotating on the hub of each wheel, a lever rigid with each ring at diametrically opposite points horizontally, a rotatable member having a vertical axis and pivotally connected with said levers, and means to rotate said member, substantially as described.

3. In vehicles, the wheels, the pivotally-supported disks in the hubs of said wheels, the axle pivotally connected centrally with said disks at right angles to the pivot of the disks in the wheels, and controlling mechanism for the wheels comprising a ring having a rotary engagement with the hubs thereof, a lever engaged rigidly with each ring at opposite points, a horizontally-rotatable part pivoted at its center and slidably connected with said levers, and means to rotate said part, substantially as described.

4. In motor-vehicles, the front wheels, a substantially disk-shaped member pivotally engaged in the hub of each wheel, the axle centrally engaged on opposite pivot-points in said member at right angles to the pivots in the wheel-hub, a ring on the inner portion of each hub and a lever rigid with each of said rings, in combination with the vehicle-body, a horizontally-rotatable member supported on said body beneath the same and slidably connected with said levers, and means above the said body to rotate said rotatable member, substantially as described.

Witness my hand to the foregoing specification this 17th day of May, 1899.

JOHN H. WARREN.

Witnesses:
H. T. FISHER,
R. B. MOSER.